(12) United States Patent
Molina-Muntañola

(10) Patent No.: US 9,463,897 B2
(45) Date of Patent: Oct. 11, 2016

(54) BOX FOR FOOD PRODUCTS

(71) Applicant: Pablo Molina-Muntañola, Barcelona (ES)

(72) Inventor: Pablo Molina-Muntañola, Barcelona (ES)

(*) Notice: Subject to any disclaimer, the term of this patent is extended or adjusted under 35 U.S.C. 154(b) by 0 days.

(21) Appl. No.: 14/885,029

(22) Filed: Oct. 16, 2015

(65) Prior Publication Data
US 2016/0137339 A1 May 19, 2016

Related U.S. Application Data

(63) Continuation-in-part of application No. 14/177,703, filed on Feb. 11, 2014, now abandoned.

(51) Int. Cl.
| | |
|---|---|
| B65D 5/24 | (2006.01) |
| B65D 5/40 | (2006.01) |
| B65D 5/56 | (2006.01) |
| B65D 5/62 | (2006.01) |
| B32B 27/10 | (2006.01) |
| B32B 27/30 | (2006.01) |
| B32B 27/32 | (2006.01) |
| B32B 29/08 | (2006.01) |
| B65D 5/66 | (2006.01) |

(52) U.S. Cl.
CPC ........... *B65D 5/563* (2013.01); *B32B 27/10* (2013.01); *B32B 27/302* (2013.01); *B32B 27/32* (2013.01); *B32B 29/08* (2013.01); *B65D 5/248* (2013.01); *B65D 5/62* (2013.01); *B65D 5/6667* (2013.01); *B32B 2250/03* (2013.01); *B32B 2250/40* (2013.01); *B32B 2307/304* (2013.01); *B32B 2307/308* (2013.01); *B32B 2439/62* (2013.01); *B32B 2439/70* (2013.01); *B65D 5/40* (2013.01)

(58) Field of Classification Search
CPC ....... B65D 5/243; B65D 5/246; B65D 5/248
See application file for complete search history.

(56) References Cited

U.S. PATENT DOCUMENTS

| | | | | |
|---|---|---|---|---|
| 3,406,052 A * | 10/1968 | Peters | .................. | B29C 65/106 156/198 |
| 3,877,630 A * | 4/1975 | Silver | .................... | B65D 5/244 156/247 |
| 4,391,405 A * | 7/1983 | Drinon | .................. | B65D 5/248 229/145 |
| 4,951,868 A * | 8/1990 | Mode | .................... | B65D 5/2047 229/112 |
| 5,575,418 A * | 11/1996 | Wu | ........................ | A23B 7/148 229/120 |
| 7,870,992 B2 * | 1/2011 | Schille | ............... | B65D 81/3858 229/103.11 |
| 2002/0036229 A1 * | 3/2002 | Muise | ...................... | B31B 7/00 229/5.84 |
| 2005/0133577 A1 * | 6/2005 | Bowman | ............. | B65D 5/2042 229/116.5 |
| 2005/0252953 A1 * | 11/2005 | Schou | .................... | B65D 5/563 229/5.83 |
| 2006/0219768 A1 * | 10/2006 | Philips | ................... | B65D 5/247 229/186 |

\* cited by examiner

*Primary Examiner* — Gary Elkins
(74) *Attorney, Agent, or Firm* — Hoglund & Pamias, PSC; Roberto J. Rios

(57) ABSTRACT

The invention provides a box for food products having a prismatic body provided with a bottom base, sidewalls and a top opening, and a closure cover of the top opening. The body and the cover are formed from a sheet of corrugated cardboard having an outer face covered with water-proof and water-repellent paint or varnish and an inner face covered with waterproof sheets or films of polyethylene (PE) or vinyl polymer. The box of the invention is waterproof and resistant for transporting food products.

4 Claims, 3 Drawing Sheets

US 9,463,897 B2

BOX FOR FOOD PRODUCTS

FIELD OF THE INVENTION

The present invention relates to a box for food products, comprising: a prismatic body provided with a bottom base, side walls and a top opening, and a closure cover of the top opening. This box has constructive particularities aimed at providing it with resistant and water-proof features for transporting food products.

This invention is applicable in the field dedicated to manufacturing boxes and packages, particularly, though in a non-limiting manner, for seafood and foods in general.

BACKGROUND OF THE INVENTION

Containers having different characteristics are used today in the field of food for storing and distributing various products.

The transport of certain food products, which are marketed as refrigerated or frozen food products, requires the use of specific boxes suitable for maintaining their characteristics in a higher or lower range of temperatures.

A typical example of boxes used in these applications are expanded polystyrene boxes, formed by a body and a cover, or by two half-bodies coupled to one another, demarcating an inner space for arranging the product to be transported.

These expanded polymer material boxes have suitable waterproof and thermal insulation characteristics; however, they have the drawback that, since they have a pre-formed and fixed structure, they occupy the same volume when they are empty as they do when they are in use, which makes it difficult to store and transport them up until the moment they are used.

An alternative to these expanded polystyrene or polymer material boxes are waxed boxes, which are formed from a sheet of cardboard that is covered on at least one of its faces with a layer of wax, the purpose of which is to provide it with greater water-proofing and to prevent the cardboard from getting wet, the box losing consistency.

These waxed boxes have various drawbacks, among which are their high price and deterioration according to temperature; when the temperature is high, the wax melts and is highly inflammable; and when the temperature is very low, for example for transporting frozen products, the wax cracks and breaks, no longer performing the function of water-proofing the cardboard of the box.

There are also boxes of corrugated cardboard covered with a polyethylene (PE) film inside and nothing outside. The problem with this type of box is that, while in transit, each time it is moved from a cold-temperature chamber to inside a cold truck, boat or plane, the moisture adhered to the box turns into water penetrating inside the cardboard box affecting the structure of the box and eventually breaking. Boxes with corrugated sheet with (PE) inside and out are also available. The problem with this type of box is that it becomes excessively rigid and when assembled, many parts of the box become cracked, where moisture penetrates these cracks and again affecting the structure of the box and eventually breaking. There are also boxes with corrugated cardboard being covered with water-repellent paint inside and outside. The problem with this type of box is actually inside. Waterproof paint or varnish protects from moisture and at particular times it protects from the discrete contact of water such as rain, but it cannot withstand containing continuous amounts of water for extended periods of times. Thus, the water eventually enters the cardboard box and as with the previous boxes, affecting the structure of the box and eventually breaking. In addition, the paint or varnish used must be approved for food contact by government agencies such as the FDA.

Therefore, the technical problem that is considered is the construction of a box for food products simultaneously having the advantage of water-proofing expanded polymer material boxes, high resistance against deformation, and the advantage of transporting and storing the box in a flat configuration and assembling it when use thereof is required.

The applicant of the invention is unaware of the existence of earlier inventions which simultaneously and satisfactorily meet these requirements.

SUMMARY OF THE INVENTION

The box for food products object of this invention, comprising a prismatic body provided with a bottom base, sidewalls and a top opening, and a closure cover of the top opening, has constructive particularities aimed at achieving the aforementioned objectives.

According to the invention, the body and the cover are formed from a sheet of corrugated cardboard having an inner face covered with continuous waterproof sheets or films of polyethylene or vinyl polymer and an outer face covered with water-proof and water-repellent paint or varnish.

The use of the sheet of corrugated cardboard having an inner face covered with continuous waterproof sheets or films of polyethylene or vinyl polymer and an outer face covered with water-proof and water-repellent paint or varnish, allows obtaining various advantages such as: obtaining the flat configuration of the box by conventional die-cutting techniques; the possibility of transporting and storing the box flat until it is used; the corrugated cardboard providing a resistant structure to the box; and the complete water-proofing of the outer and inner surfaces of the box by covering an inner face with continuous waterproof sheets or films of polyethylene or vinyl polymer and an outer face with water-proof and water-repellent paint or varnish.

Other relevant advantages of the invention are that the box has smaller volume and weight and that a higher net weight of product can be carried in one and the same volume.

With respect to expanded polystyrene boxes, the box of the invention has the advantage of having between 30% and 40% less volume, so the net weight to be transported in air and sea containers increases by 40%.

Another advantage of the invention is that the box is recyclable, while none of the boxes used until now is recyclable.

The body of the box has corner portions between the sidewalls, provided with folding lines for folding it into a box assembly position.

Said corner portions are prolonged from the corners of the bottom base and from the corresponding side walls of the body of the box, extending to the top end of said side walls These corner portions allow in the assembly position, the body of the box to form a type of waterproofing tray on both the inner and outer face thereof, preventing possible liquids coming from the foods or from the freezing of the frost formed on the body of the box from being able to wet the sheet of corrugated cardboard, weakening the structure of the box.

Unlike what occurs with the wax in waxed boxes, the continuous waterproof sheets or films of polyethylene or vinyl polymer covering the inner face and the water-proof and water-repellent paint or varnish covering the outer face maintain their waterproof characteristics within the temperature ranges in which both fresh and frozen food products are usually transported and stored.

The body and the cover define in a box assembly position a receptacle for food products having inner and outer surfaces that are waterproof in their entirety.

These and other additional features of the invention, which are described in the attached claims, will be better understood in view of the embodiment shown in the attached drawings.

BRIEF DESCRIPTION OF THE DRAWINGS

To complement the description that is being made and for the purpose of aiding to understand the features of the invention, a set of drawings is attached to the present specification in which the following has been depicted with an illustrative and non-limiting character.

DETAILED DESCRIPTION OF THE INVENTION

Figure 1:
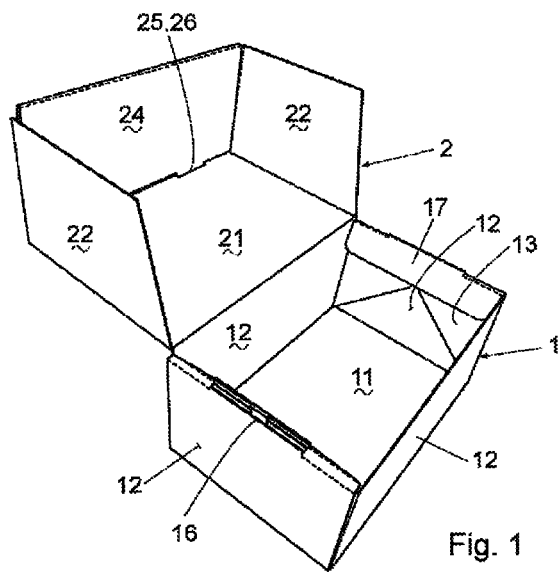
FIG. 1 shows a perspective view of an embodiment of the box for food products according to the invention, assembled and with the cover open.

As can be seen in FIG. 1, the box comprises a prismatic body (1) and a closure cover (2).

Figure 2:
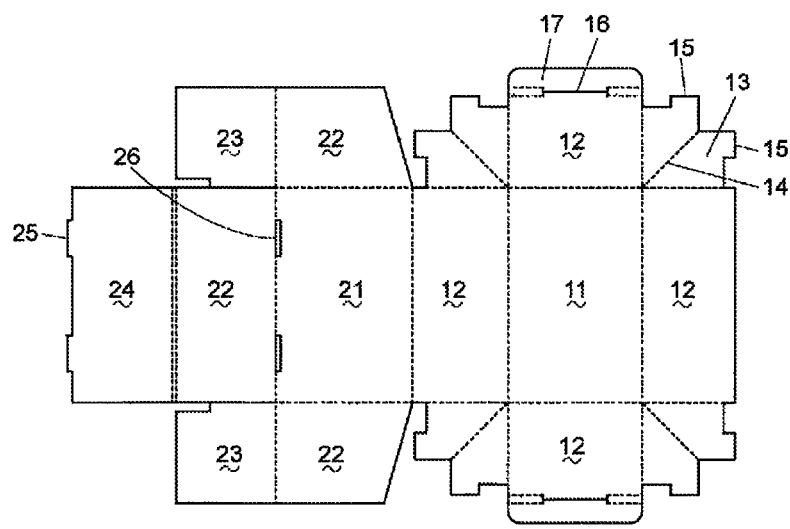
FIG. 2 shows a flat configuration view of the box of the preceding figure.
Figure 3:
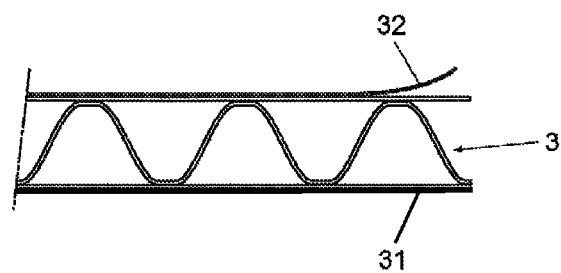
FIG. 3 shows a detail of the section of the sheet of corrugated cardboard with the waterproof sheets of polyethylene or vinyl polymer applied on the inner face thereof and the water-proof and water-repellent paint or varnish applied on the outer face thereof, and with the ends thereof slightly raised to aid viewing.

FIG. 2 shows the flat configuration of the box shown in FIG. 1 and formed by a sheet of corrugated cardboard (3) having an outer face (31) covered with water-proof and water-repellent paint or varnish and an inner face covered with waterproof sheets or films (32) of polyethylene or vinyl polymer as shown in FIG. 3.

Figure 5:
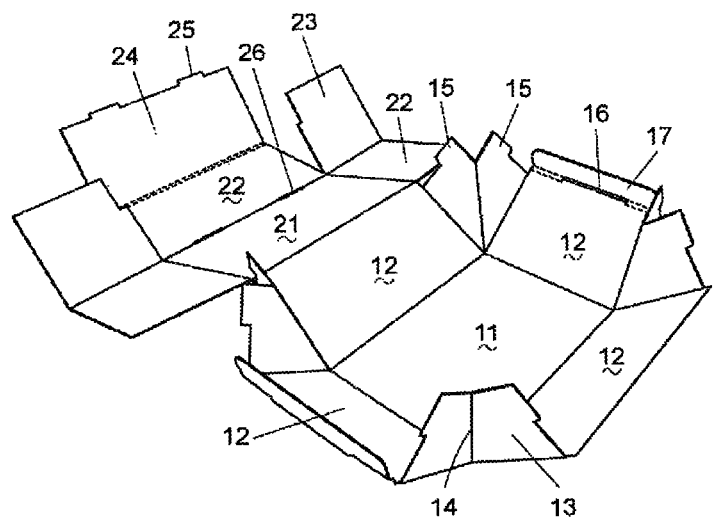
FIGS. 5 and 6 show successive phases of assembly of the box of FIG. 1 from the flat configuration depicted in FIG. 2.
Figure 6:
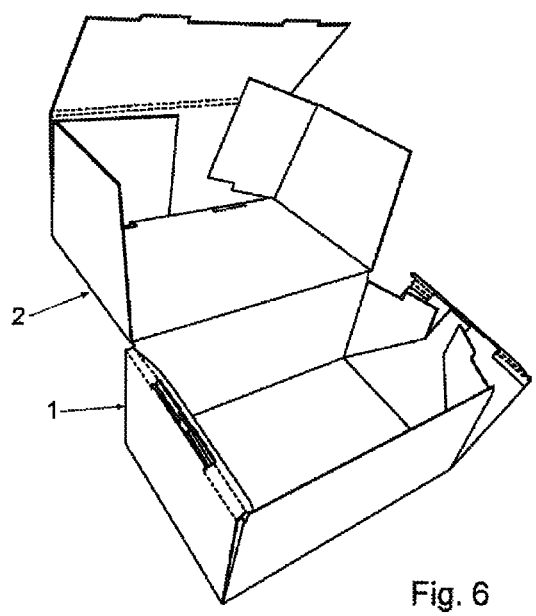

The body (1) of the box is provided with a rectangular bottom base (11) and with side walls (12) between which there are defined corner portions (13) provided with folding lines (14) for folding it into a box assembly position, as shown in FIGS. 5 and 6.

These corner portions (13) have two symmetrical halves having a right-angled triangle configuration demarcated by an intermediate folding line (14); the symmetrical halves of said corner portions being prolonged at their top end into respective retaining flaps (15) which are housed in grooves (16) defined in the top end of two opposite side walls (12) of the body of the box that are prolonged into closure flaps (17).

It should be mentioned, however, that the retention of the corner portions (13) in the box assembly position can be done by other known conventional means, for example by means of gluing on the outer face.

In any case, once the box is assembled, the body (1) defines a receptacle the inner and outer surfaces of which are waterproof in their entirety and from the base to the top opening of the body (1).

Figure 4:
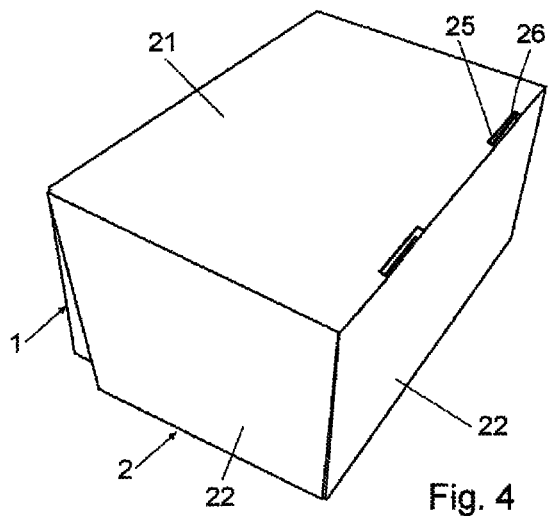
FIG. 4 shows a perspective view of the box of FIG. 1 with the cover in the closed position.

In the example shown, the cover (2) forms a one-piece body with the body (1) one of the side walls (12) of the body (1) being prolonged into a central portion (21) of the cover, having a configuration and dimensions suitable for covering the top opening of the body (1); said closure cover (2) comprising peripheral closure walls (22) overlapping the side walls (12) of the body (1) of the box, as can be seen in FIG. 4.

In the specific example shown, two of the peripheral walls (22) of the cover occupying opposing positions are prolonged into respective portions (23) which are internally clasped by a prolongation (24) of the remaining peripheral wall (22) in the box assembly position.

For retaining the cover in the assembly position, the prolongation (24) has flaps (25) intended for being housed in grooves (26) defined for that purpose at one of the ends of the central portion (21) of the cover.

Nevertheless, it should be mentioned that regardless of the configuration used for assembling the cover (2), shown by way of illustration, the fundamental feature of said cover is that it is formed like the body (1) from a sheet of corrugated cardboard (3) having an outer face covered with water-proof and water-repellent paint or varnish and an inner face covered with waterproof sheets or films of polyethylene or vinyl polymer.

Having sufficiently described the nature of the invention as well as a preferred embodiment thereof, it is hereby stated for all intents and purposes that the materials, shape, size and arrangement of the described elements may be modified provided that such modification does not involve altering the essential features of the invention that are claimed below.

I claim:

1. A box for food products, comprising: a prismatic body provided with a bottom base, side walls and a top opening, and a closure cover of the top opening; characterized in that: the body and the cover are formed from a sheet of corrugated cardboard having an outer face covered with water-proof and water-repellent paint or varnish and an inner face covered with waterproof sheets or films of polyethylene (PE) or vinyl polymer; the body of the box has corner portions between the side walls, provided with folding lines for folding it into a box assembly position, which are prolonged from the corners of the bottom base and from the corresponding side walls of the body of the box and extend to the top end of said side walls; and the body and the cover define in a box assembly position a receptacle for food products, having inner and outer surfaces that are waterproof in their entirety.

2. The box according to claim 1, wherein each corner portion of the body of the box has two symmetrical halves having a right-angled triangle configuration, demarcated by an intermediate folding line, the symmetrical halves of which are prolonged at the top end into respective retaining flaps with respect to two opposite side walls of the body of the box.

3. The box according to claim 1, wherein the closure cover comprises a central portion having suitable configuration and dimensions for covering the top opening of the body, and peripheral closure walls overlapping the side walls of the body of the box.

4. The box according to claim 3, wherein the cover and the body of the box are formed in a single sheet, one of the side walls of the body being prolonged into one of the sides of the central portion of the cover.

* * * * *